July 31, 1956  H. J. LINGAL ET AL  2,757,261
CIRCUIT INTERRUPTERS
Filed July 19, 1951  10 Sheets-Sheet 1

WITNESSES:
Robert G. Baird
W. R. Crout

INVENTORS
Harry J. Lingal, Thomas E. Browne, Jr.,
and Albert P. Strom.
BY Ralph H. Swingle
ATTORNEY July 31, 1956  H. J. LINGAL ET AL  2,757,261
CIRCUIT INTERRUPTERS
Filed July 19, 1951  10 Sheets-Sheet 2

WITNESSES:
Robert C. Baird
W. R. Crout

INVENTORS
Harry J. Lingal,
Thomas E. Browne, Jr.,
and Albert P. Strom.
BY
Ralph H. Swingle
ATTORNEY July 31, 1956  H. J. LINGAL ET AL  2,757,261
CIRCUIT INTERRUPTERS Filed July 19, 1951  10 Sheets-Sheet 3

WITNESSES:

INVENTORS
Harry J. Lingal, Thomas E. Browne, Jr.,
and Albert P. Strom.
BY
ATTORNEY

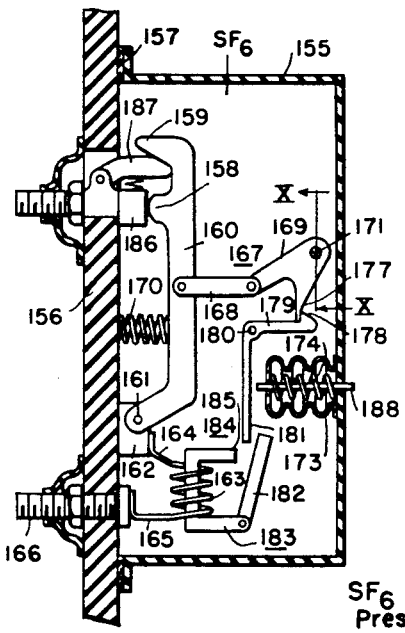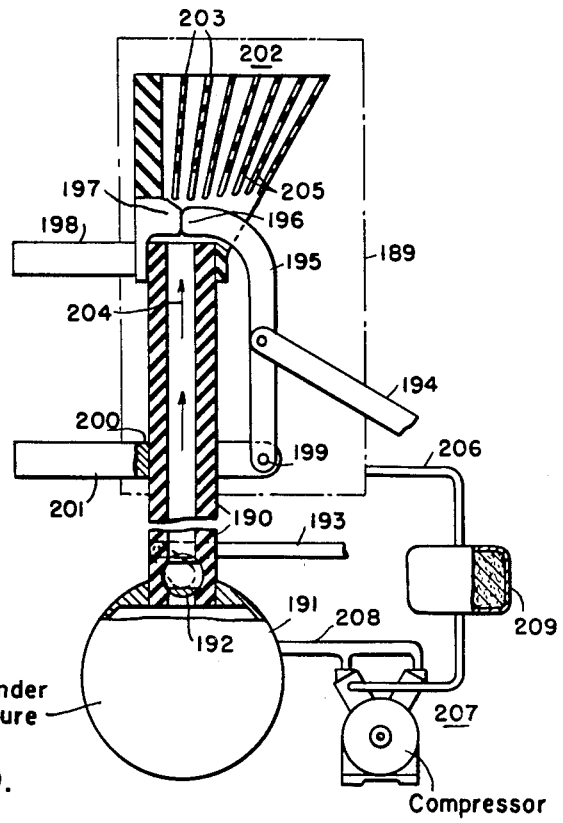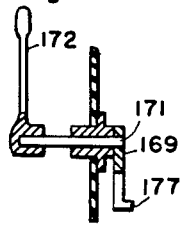

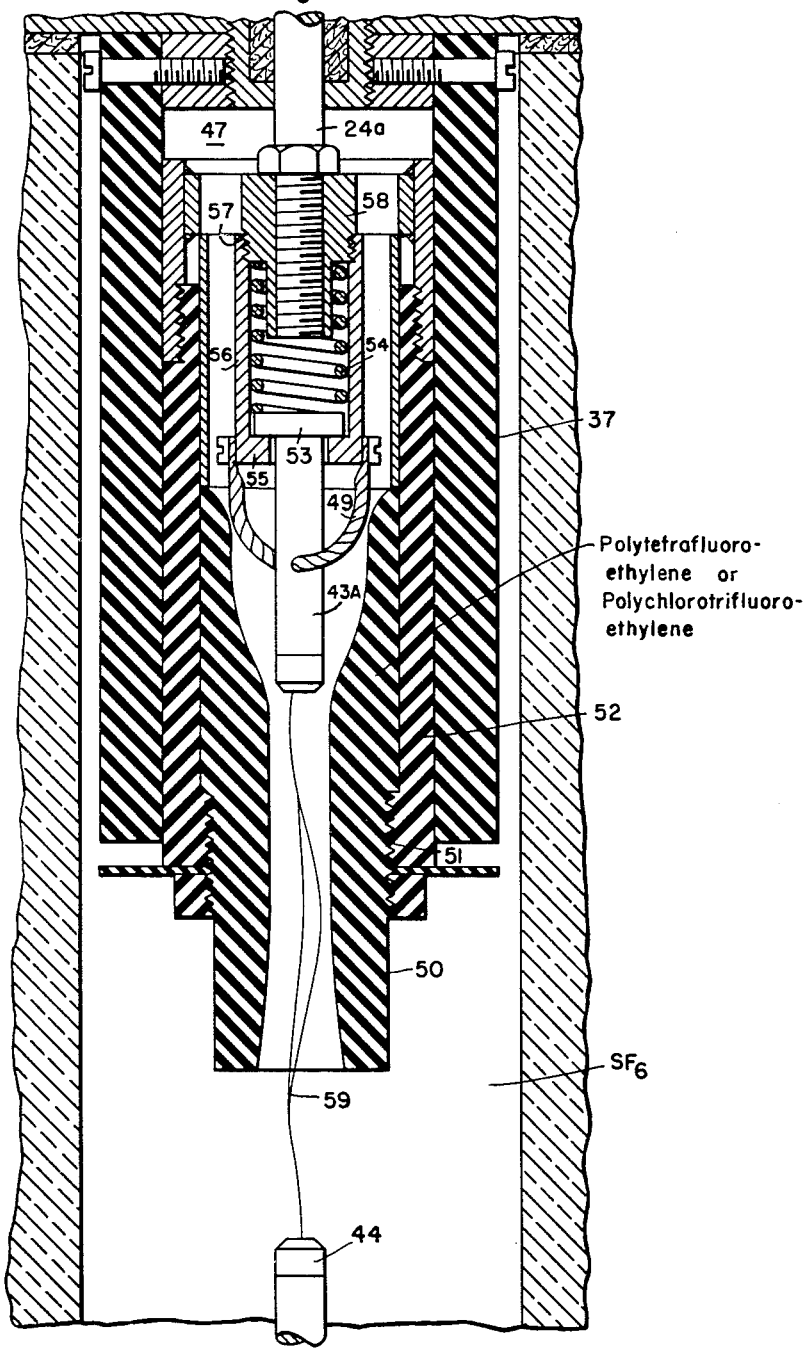

United States Patent Office 2,757,261
Patented July 31, 1956

2,757,261
CIRCUIT INTERRUPTERS

Harry J. Lingal, Forest Hills, Thomas E. Browne, Jr., Pittsburgh, and Albert P. Strom, Forest Hills, Pa., assignors to Westinghouse Electric Corporation, East Pittsburgh, Pa., a corporation of Pennsylvania Application July 19, 1951, Serial No. 237,502

33 Claims. (Cl. 200—148)

This invention relates to circuit interrupters in general, and, more particularly, to improved arc-extinguishing structures therefor. Certain features of the invention are described and claimed in applicants' divisional application, filed May 10, 1956, Serial No. 584,133, entitled "Circuit Interrupter," and assigned to the assignee of the instant application.

A general object of our invention is to provide a circuit interrupter embodying sulfur hexafluoride gas, whereby vastly improved interrupting performance is obtained.

Another object is to provide improved circuit interrupting apparatus embodying sulfur hexafluoride gas as the arc interrupting medium, in conjunction with means for blowing the sulfur hexafluoride gas through electrical arcs therein.

The use of sulfur hexafluoride ($SF_6$) gas merely as an insulating medium has been known for some time. Refer, for example, to U. S. Patent 2,221,671, issued November 12, 1940, to Franklin S. Cooper. This patent discloses the use of sulfur hexafluoride gas as a dielectric medium in electrical equipment relying essentially on the dielectric strength of the sulfur hexafluoride.

Those skilled in the art know that there is little correlation between the dielectric strength of a gas and its ability to extinguish electrical arcs. For example, hydrogen has approximately half the dielectric strength of air but hydrogen gas will interrupt electrical arcs of several times the amperage that air will under the same test conditions. We have discovered hitherto unknown and phenomenal arc interrupting and extinguishing properties of sulfur hexafluoride. These properties are not apparent from or suggested by any facts previously known with regard to sulfur hexafluoride.

The present invention is not primarily concerned with the use of sulfur hexafluoride as a dielectric gas in electrical equipment functioning essentially to insulate conducting parts at different potentials, but the invention is based on the utilization of the circuit interrupting properties of sulfur hexafluoride gas which we have found to be truly phenomenal. We have discovered, for example, that in plain break switch devices (that is, switches functioning with a simple separation of a pair of abutting contacts disposed in a gas chamber) for a three-inch long gap between the contacts in relatively still sulfur hexafluoride, that the arc-interrupting capacity of the switch in the sulfur hexafluoride gas was of the order of 100 times as great as with air.

Furthermore, we have discovered even greater arc interrupting effectiveness of sulfur hexafluoride when it is blown through an electrical arc developed in operation of a circuit interrupter. For example, by employing a device utilizing, for instance, a piston to obtain forced gas flow of sulfur hexafluoride through the arc, we obtain of the order of 200 times greater interrupting performance than in still sulfur hexafluoride.

It is known to use insulating orifices of organic materials, such as horn fiber, which give off decomposition gases on being subjected to arcing and such fiber orifices have been found superior to either metallic orifices or to refractory orifices in many types of air blast breakers. However, in making interruption tests in gases containing fluorine, such as sulfur hexafluoride, these organic material orifices have been found to be unsatisfactory because hydrogen is one of the decomposition products liberated from the organic orifice material during exposure to an arc, and this hydrogen combines with the free fluorine, which is also liberated momentarily from the sulfur hexafluoride gas, to form lasting highly corrosive acids. These corrosive acids will, of course, attack the materials in the breaker. Barriers and other members subjected to arcing will behave similarly.

We have discovered a solution to this difficulty by using polytetrafluoroethylene or polychlorotrifluoroethylene orifices in interrupters embodying sulfur hexafluoride as the arc-interrupting gas. From such polytetrafluoroethylene orifices, fluoro-carbon gas can be liberated, and this does not form corrosive acids with the arc products of the sulfur hexafluoride.

Further objects of our invention relate to particular interrupting devices employing sulfur hexafluoride gas for arc-interruption, and will become more apparent upon reading the following specification taken in conjunction with the drawings, in which:

Fig. 8 is a modified type of circuit interrupter, the contact structure of which is shown in the closed-circuit position;

Fig. 9 is a circuit interrupter of the forced gas flow type, the contact structure being shown in the closed-circuit position;

Fig. 10 is a fragmentary sectional view taken along the line X—X of Fig. 8;

Fig. 11 is a modified type of piston arrangement which may be used in place of the piston arrangement of Fig. 2;

Figure 1:
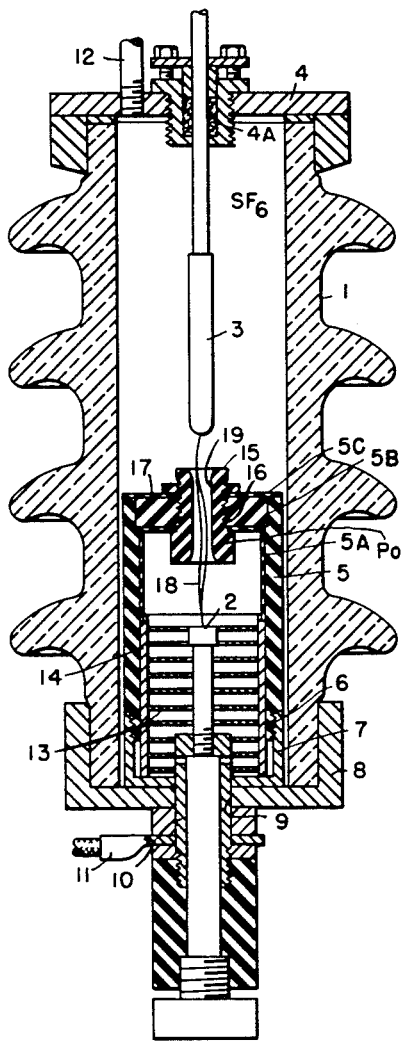
Figure 1 illustrates an "explosion pot" type of circuit interrupter, using sulfur hexafluoride gas with the contact structure illustrated in the open-circuit position.
Figure 14:
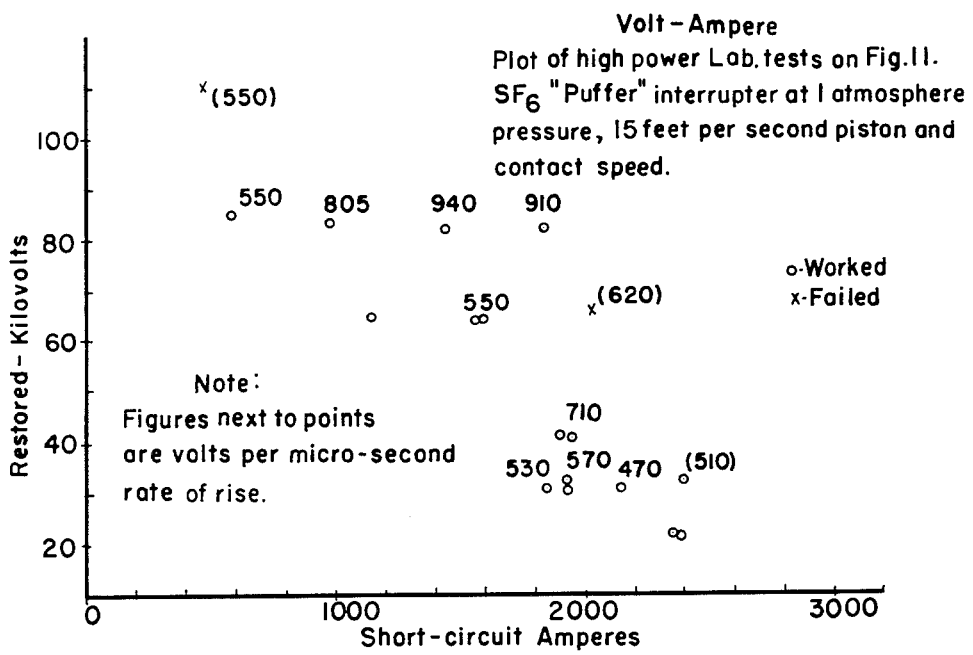
Figure 15:
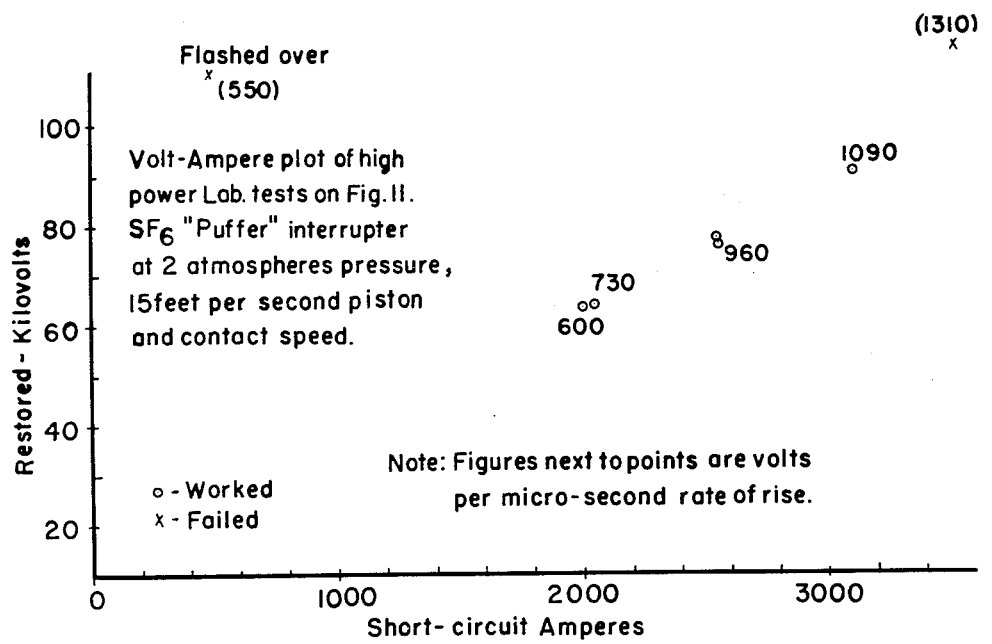
Figure 16:
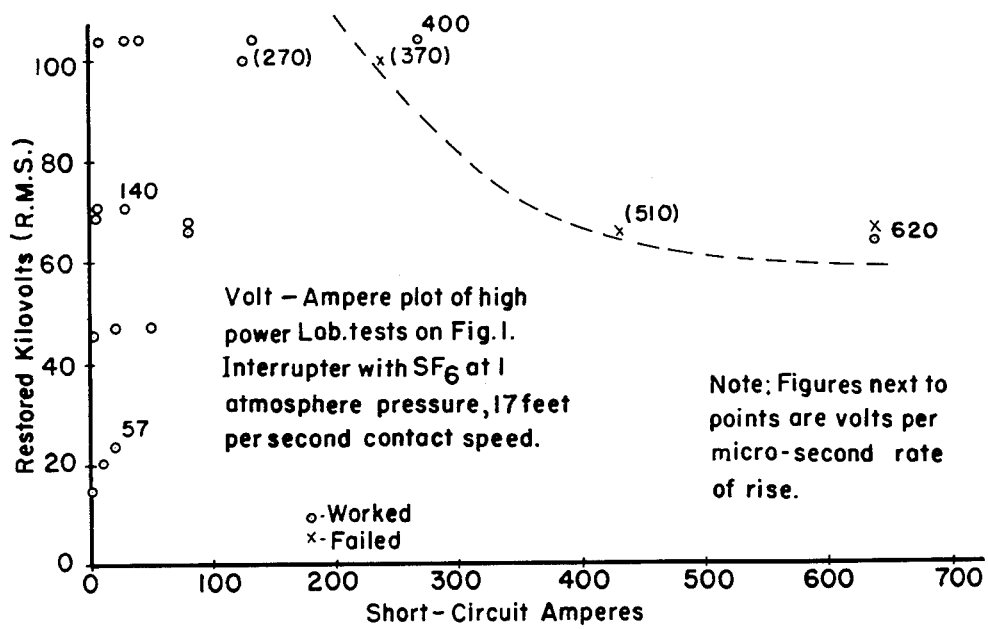
Figure 17:
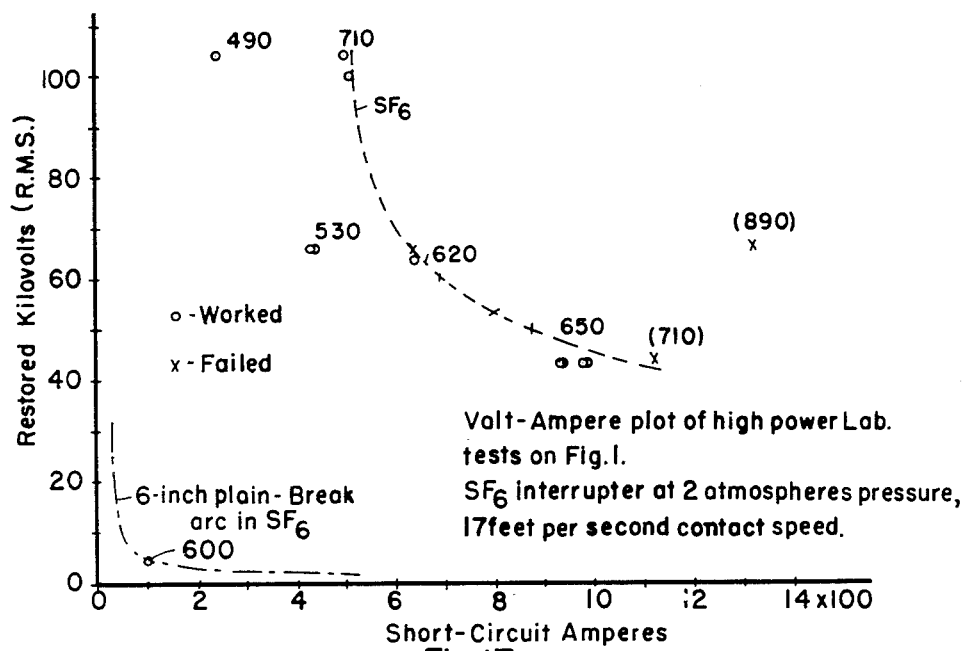
Figure 18:
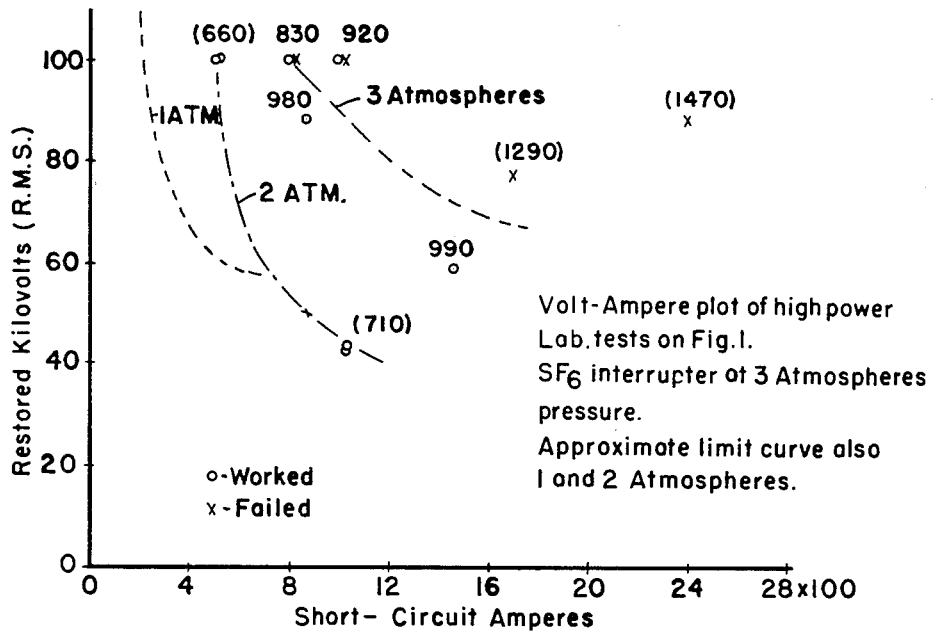
Figure 19:
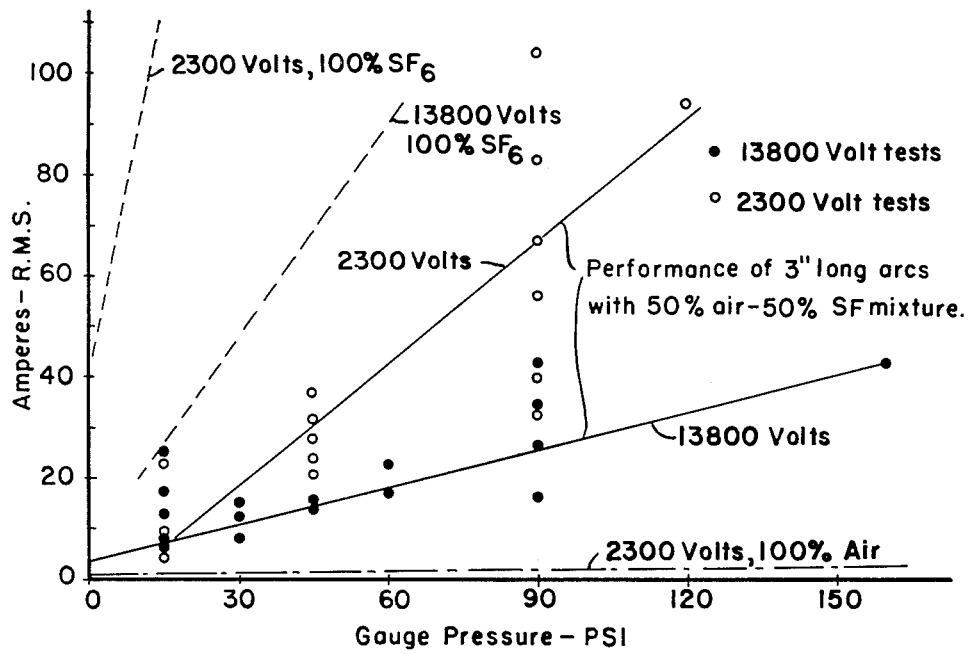

Fig. 14 is a plot of the interrupting points relating restored kilovolts (R. M. S.) to short-circuit amperes for the "puffer" type of interrupter as shown in Fig. 11, with the sulfur hexafluoride gas at atmospheric pressure and with the piston and contact separation speed of approximately 15 feet per second; the figures next to the points being volts per microsecond rates of rise of the recovery voltage transient;

Fig. 15 is a plot similar to the plot of Fig. 14 for the same interrupter as in Fig. 11, but with the sulfur hexafluoride being at two atmospheres pressure instead of one;

Fig. 16 is a graph showing the performance of an interrupter of the type shown in Fig. 1 provided with sulfur hexafluoride gas at one atmosphere pressure;

Fig. 17 is a graph showing the interrupting performance of an interrupter of the type shown in Fig. 1 with the sulfur hexafluoride gas maintained therein at two atmospheres pressure;

Fig. 18 is a graph showing the interrupting performance of an interrupter of the type set out in Fig. 1 using sulfur hexafluoride gas at various pressures; and Fig. 19 is a graph plotting points and curves from tests of a given interrupter using: (1) a mixture of still gas composed of 50% air and 50% sulfur hexafluoride, at two different voltages; (2) a still gas composed of 100% sulfur hexafluoride at two different voltages; and (3) a still gas composed of 100% air at 2,300 volts. The graph plots the interrupting performance in terms of current being interrupted against the gauge pressure in pounds per square inch of the gas used.

As indicated hereinabove, we have discovered previously unknown and completely unexpected arc-interrupting properties of sulfur hexafluoride gas. We have applied sulfur hexafluoride gas to a variety of circuit interrupters to take advantage of our discovery and thereby have been able to operate the interrupters successfully far beyond any previously established maximum service condition therefor. The application of sulfur hexafluoride in circuit interrupters in accordance with this invention promises to change present concepts of circuit interruption as to circuit interrupting performance, size of apparatus to handle given electrical current, and the construction of circuit interrupter structures.

More specifically, we have discovered that sulfur hexafluoride gas may be used with outstanding and hitherto unrealizable results in many different classes of circuit interrupting devices. For example, this unusual gas with its remarkable interrupting ability may be used in lightning arresters as an interrupting medium between the several gap elements, and in circuit interrupters of the type either utilizing a forced gas flow or employing magnetic means to effect arc lengthening. Moreover, the sulfur hexafluoride gas may be used in types of circuit interrupting equipment employing two or more breaks in series to increase the voltage interrupting ability, one break being utilized for generating pressure in the gas to effect gas flow at the other break; or one of the two serially related breaks may be shunted by impedance means to effect a lowering of the rate of rise of the recovery voltage transient, thereby enabling circuit interruption to take place more easily at this gap, and subsequently at the other serially connected gap.

Sulfur hexafluoride gas may also be used in so-called "explosion pot" types of interrupters in which a movable contact practically fills an orifice leading into a substantially enclosed chamber where contact separation initially takes place, the arc initially formed heating the sulfur hexafluoride gas confined in this enclosed chamber to cause its ejection out through the orifice when the latter is "unplugged" by removal of the movable contact therefrom. The sulfur hexafluoride gas may also be employed in interrupters of the "puffer" type in which a mechanical arrangement, such as a piston independently biased, or movable with the movable contact, is utilized for forcing a blast of the sulfur hexafluoride gas against the arc.

Also, the sulfur hexafluoride gas may be stored in a chamber while under a high pressure, and, when circuit interruption is required, it is released to escape through a gas blast tube to force an arc formed transversely across the end of the blast tube laterally against a plurality of adjacently disposed arc splitters.

While the following description will deal specifically with each of the aforementioned types of interrupting devices, it will be appreciated many other types of circuit interrupters may have sulfur hexafluoride applied to improve their operation.

Referring to the drawings, and more particularly to Fig. 1 thereof, there is illustrated an interrupter device wherein the reference numeral 1 designates a porcelain casing, within which is disposed a stationary contact 2, and a movable rod-shaped contact 3 passes through a closure 4 applied to the upper end of the casing and is guided by a bushing 4A. The contact is actuated externally of the casing 1 by any suitable mechanism (not shown).

It will be noted that the stationary contact 2 is disposed interiorly within an "explosion chamber" comprising an insulating cylinder 5 threaded, as at 6, to a metallic cup 7 disposed at the lower end of the casing 1. A cap 8 encloses the lower end of casing 1, and is apertured at 9 to permit a tubular extension 10 of the stationary contact 2 to pass therethrough. A line terminal 11 may be connected to this extension 10, whereas the other line terminal for the interrupter may be connected, as by a slide connection, or otherwise, to the movable contact 3. The casing 1, closure 4 and cap 8 provide a hermetically sealed interrupting device.

A conduit 12, sealed off after filling, or provided with suitable valve means (not shown), is attached to the closure 4 to permit the filling of the casing 1 with sulfur hexafluoride gas from a source of supply thereof, or a gas mixture containing sulfur hexafluoride gas. While an initial filling of the sulfur hexafluoride gas should be sufficient for the normal life of the interrupter, leakage or other loss may require subsequent replenishment. Perforated copper cooling plates 13 are provided for cooling the gases when subjected to arcing. The cooling plates are rigidly affixed, as by soldering, to a metallic cylinder 14 disposed interiorly within the lower end of the explosion chamber 5.

An insulating orifice member 15, threaded, as at 16, to the upper end plate 17 of the explosion chamber 5, is provided to permit passage of contact 3 therethrough and to direct a stream of the sulfur hexafluoride gas against the arc, which, for purposes of illustration, is represented by the reference character 18.

In the operation of the device, the movable contact 3 is caused to separate from the stationary contact 2, and since it substantially closes the opening 19 through the orifice member 15, pressure is generated in the body of sulfur hexafluoride gas within the explosion chamber 5 by the heat of the established arc. Following withdrawal of the movable contact 3 out of the opening 19 of the orifice member 15, there occurs a stream or blast of the compressed sulfur hexafluoride gas escaping from the explosion chamber 5. The stream of sulfur hexafluoride gas is directed through the arc and quickly effects extinction of the arc 18, and hence circuit interruption is obtained.

We built and tested an interrupter corresponding to that of Figure 1, wherein the movable contact 3 was substantially 5/8 inch in diameter, the explosion chamber 5 was substantially five inches in diameter and approximately nine inches long, and the orifice member 15 was approximately 3¼ inches long and was substantially closed by the disposition of the movable contact 3 therein in the closed position of the device. Fig. 16 shows a plot of the volt-ampere interrupting characteristics of this interrupter with the sulfur hexafluoride gas being initially present at one atmosphere pressure, and with a contact separation speed of 17 feet per second. The figures next to the points are volts per microsecond rate of rise of the recovery voltage transient. These figures were actual measurements from oscillograms, except that the figures in parentheses have been estimated by extrapolation based on experience that it varies as the square root of the product of current multiplied by voltage.

This curve shows that even though the pressure in this interrupting device corresponding to Fig. 1 is self-generating, it operated successfully to interrupt electrical currents over a wide range of amperage and voltage. The arcing time in the low current range varied from 1 to 3.5 half cycles of 60 cycle current. Contact separation at which successful interruption occurred varied from 0.48 to 4.6 inches. The phenomenal arc interrupting characteristics of the sulfur hexafluoride gas in apparatus of Fig. 1 is evident from the tests plotted in Fig. 16. It should be noted that the entire breaker was a small fraction of the size of breakers used at present for, say 100 kilovolt-500 ampere service.

Fig. 17 is a volt-ampere plot of this interrupter corresponding to Fig. 1 with the sulfur hexafluoride gas being maintained therein at two atmospheres pressure, and with a contact separation speed of approximately 17 feet per second. For purposes of comparison there is also provided on the same graph a curve of volt-ampere circuit interrupting limits of a six inch plain break arc in the sulfur hexafluoride gas estimated from tests on a 3 inch arc, that is, without any forced gas flow. These curves indicate the very substantial improvement in arc interrupting characteristics obtained with the circuit interrupter of Fig. 1 as compared to a six inch plain break arc in still sulfur hexafluoride gas, the latter curve still indicative of outstanding arc interruption characteristics.

It is to be noted that, as indicated in both curves of Figs. 16 and 17, increasing the short circuit current will reduce the maximum voltage at which a circuit can be interrupted. Thus, points below and to the left of the curves may successfully be interrupted, whereas points falling above and to the right of the curves are above the capacity of the breaker. In other words, these curves show the critical volt-ampere interrupting characteristics of the breaker of Fig. 1 containing sulfur hexafluoride.

Fig. 18 is a volt-ampere plot of the characteristics of an interrupter, as in Fig. 1, with the sulfur hexafluoride gas being maintained therein at, one, two and three atmospheres static pressure. These curves illustrate that an increase in absolute pressure will move the critical volt-ampere curves upwardly and to the right, thereby the interrupting capacity increases with the pressure of the applied sulfur hexafluoride.

Since some free fluorine may be temporarily liberated from the sulfur hexafluoride gas during the interrupting operations, it is not desirable to use insulating orifices or other parts adjacent the arc of organic materials such as horn fiber. Hydrogen, evolved from the fiber during arcing, will react with the free fluorine to produce highly reactive hydrogen fluoride acids. We have discovered a solution to the difficulty of preventing the formation of corrosive hydrogen fluoride acids by employing insulation composed of either polytetrafluoroethylene or polymonochlorotrifluoroethylene. These fluorinated polymer materials have been found suitable for orifice materials, and arc barriers such as the cylindrical piece 5A of Fig. 1 to protect the main body of the organic insulating material forming the cylinder 5 from the heat of the arc. Also barrier discs 5B and 5C of these fluorinated polymers may be employed to protect the organic insulating material from the heat of the arc.

Accordingly, the insulation to be exposed to the arcs in circuit interrupters embodying sulfur hexafluoride is preferably composed entirely of or surfaced with a solid polymer selected from the group consisting of polytetrafluoroethylene and polychlorotrifluoroethylene. The polymers have the unit formula

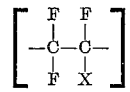

where X represents a halogen selected from the group consisting of chlorine and fluorine.

Figure 2:
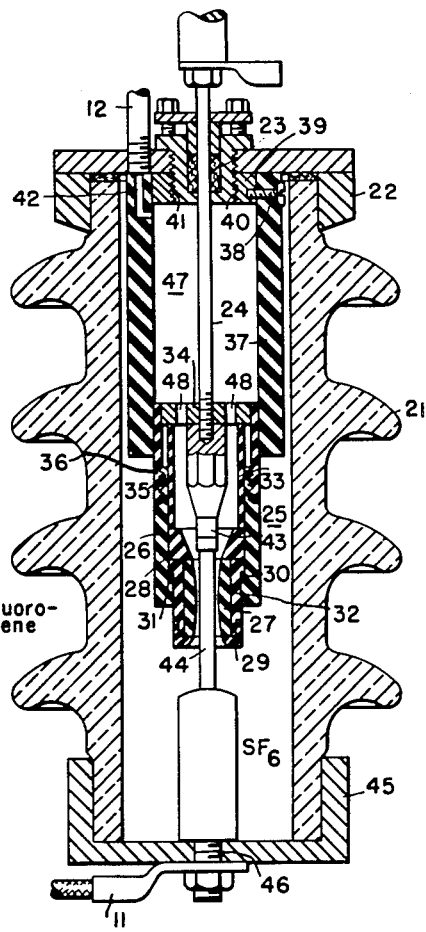
Fig. 2 illustrates a forced piston flow type of circuit interrupter, the contact structure being shown in the closed-circuit position.

Fig. 2 indicates a modified type of interrupter using sulfur hexafluoride gas and employing a piston movable with the movable contact for causing forced gas flow against or through the drawn arc. This is known as a "puffer" type of interrupter. The reference character 21 indicates a porcelain cylinder having a perforated top end cap 22 having a bushing 23, through which a movable contact rod 24 moves, under the influence of a mechanism (not shown), externally of the bushing 21.

Secured to the movable contact rod 24 is a piston, generally designated by the reference character 25, and including an insulating cylinder 26. An orifice member 27 of polytetrafluoroethylene, for instance, is disposed at one end of piston 25, being retained in place between a washer-shaped member 28 and an insulating cap 29. An internal shoulder 30 is provided at the lower end of the insulating cylinder 26 against which an outwardly turned flange 31 of a tubular member 32 is placed. The cap 29 is threadedly connected to the lower end of the insulating tube 32.

Spacing the upper side of the washer member 28 from the top of the piston 25 is an insulating spacing sleeve 33, having the upper end thereof bearing against an apertured plate 34 having apertures 48 therein. The bottom side of the washer member 28 abuts the insulating tube 32 and holds it against the shoulder 30.

The insulating cylinder 26 is threadedly connected, at 35, to an insulating cylindrical extension 36, which extension is secured, as by threading or by a press fit, as shown, to the apertured plate 34.

The piston 25 slides within a space 47 in a cooperating cylinder 37, the upper end of which is secured by one or more screws 38 to a conducting washer 39, threadedly engaged at 40 to a metallic bushing 41. The operating cylinder 37 has a channel 42 provided therein to register with a conduit 12, the latter being provided to allow introduction of sulfur hexafluoride gas to the interior of the casing 21. The lower end of the movable contact rod 24 carries a movable contact 43, which makes abutting engagement, as shown, with a stationary contact member 44, the latter being secured to an apertured lower end plate 45 closing the lower end of the casing 21. A line terminal 11 is secured to an extension 46 of the stationary contact member 44.

The operation of the breaker of Fig. 2 is as follows: During the circuit opening operation, the movable contact rod 24 is moved upwardly by a suitable external actuating mechanism not shown. The upward movement of the movable contact rod 24 not only effects separation between the contacts 43, 44 drawing an arc therebetween, but also moves the piston 25 within the interior of the operating cylinder 37, thereby causing the sulfur hexafluoride gas within the space 47 to pass through the apertures 48, provided in the plate 34, and interiorly through the piston 25 and thence through the orifice member 27 where the flow of sulfur hexafluoride gas is constricted into engagement with the arc. The flowing stream of sulfur hexafluoride gas enables a prompt and efficient extinction of the arc.

An improved piston arrangement over the one shown in Fig. 2 is shown in Fig. 11. In Figure 11, an orifice member 50 of polytetrafluoroethylene, for example, is threaded at 51, to engage matching threads at the lower end of a piston 52. The orifice member 50 is considerably longer than the orifice member in Figure 2. It will be observed that a movable contact 43A, having a cap 53, is resiliently mounted, with a compression spring 54 biased downwardly against the cap 53, which is supported on an interiorly extending flange portion 55 provided at the lower end of a conducting cylinder 56. The upper end of the cylinder 56 is threadedly connected at 57 to an apertured spider portion 58 threadely connected to the movable contact and piston rod 24a. Flexible pigtails 49 fastened to the cylinder 56 and the contact member 43A provide for flow of current to the contact member at all times.

The piston arrangement shown in Fig. 11 has advantages as far as orifice construction is concerned by directing for a longer time the sulfur hexafluoride gas flow against the arc 59 drawn between the stationary contact 44 and the movable contact 43A. However, the fundamental method of operation, namely, of providing a forced gas flow from the region 47 through the piston and against the arc 59 is the same as that shown in Fig. 2.

Fig. 14 is a plot of volt-ampere interruption test values for a "puffer" type of interrupter, as shown in Fig. 11, operated with one atmosphere pressure (absolute) of the sulfur hexafluoride gas, and a contact separation speed of approximately 15 feet per second.

This breaker was first tested with sulfur hexafluoride maintained at one atmosphere arc chamber pressure, with the applied currents being approximately 2,000 amperes, and the voltage being increased in steps until failure occurred. In this series of tests the breaker interrupted satisfactorily at 22, 33 and 44 kilovolts, and finally failed to operate at 2030 amperes at 66 kilovolts. However, on reducing the current to 1580 amperes, two successful operations were obtained at 66 kilovolts. These and other tests are plotted in Figure 14.

Fig. 15 shows a critical volt-ampere interruption characteristic plot of tests made on a "puffer" interrupter corresponding to Fig. 11 at two atmospheres pressure of sulfur hexafluoride gas, and at a contact separation speed of approximately 15 feet per second. Under these conditions, a successful interruption was obtained at 3100 amperes at 90 kilovolts. This and other test values were obtained, as shown in Figure 15.

We are able to increase the interrupting ability of arcs in sulfur hexafluoride still further by impedance shunting. Since the recovery rate of the arc in sulfur hexafluoride is 100 times or more that in air, only relatively small shunts are required. It thus becomes feasible to produce breakers in which during operation there result two or more arcs in series, at least one arc of which is shunted, and thereby we are able to interrupt very heavy currents at high voltages.

Figure 3:
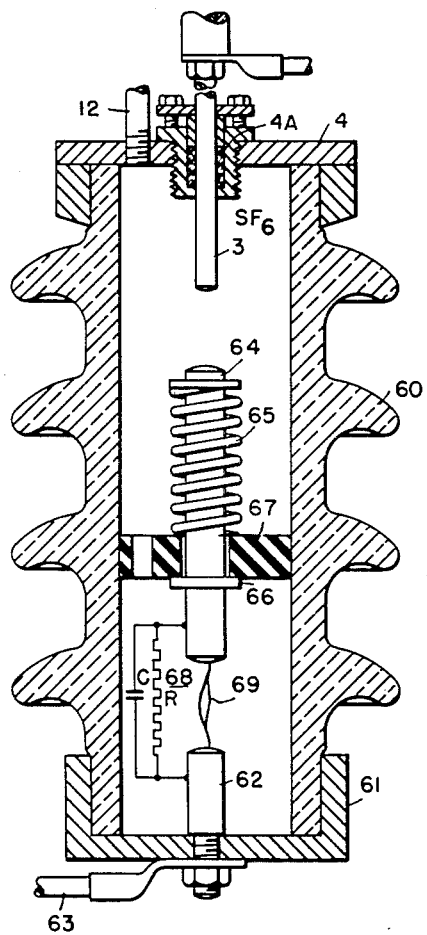
Fig. 3 illustrates a modified type of circuit interrupter establishing two serially connected arcs with one of the arcs being shunted to lower the rate of rise of the recovery voltage, and thereby enable the circuit to more easily be interrupted at the other serially connected break.

Illustrative of this feature is Fig. 3 showing a modified type of interrupter having a porcelain casing 60, to which is affixed a lower end cap 61 carrying a stationary contact 62. Externally of the cap 61, a line connection 63 is fastened to the stationary contact 62. The upper end of the casing 60 is provided with a closure 4 having a bushing 4a, through which a movable contact 3 passes. The movable contact 3 makes abutting engagement with an intermediate contact 64, the latter being biased upwardly in an opening direction away from the stationary contact 62 by a compression spring 65. The intermediate contact 64 is provided with a stop flange portion 66, which strikes an apertured plate 67 during the opening operation. The entire casing 60 is filled with sulfur hexafluoride gas.

Shunting the stationary and intermediate contacts 62, 64 is impedance means, generally designated by the reference numeral 68, and in this instance comprising a resistance R and a parallel-connected capacitance C. During the opening operation the impedance means 68 facilitates the extinction of the arc 69, drawn between the contacts 62, 64 in known manner. The residual current passing through the impedance means 68 following extinction of the arc 69 is readily interrupted by the sulfur hexafluoride gas present in the casing 60, upon the separation of the movable contact 3 from the intermediate contact 64. Thus, Fig. 3 is an illustration of an interrupter provided with sulfur hexafluoride cooperating to produce improved functioning with two sequential breaks in series, with the first break being shunted by impedance means 68 to facilitate the interruption of the arc 69 and to improve the power factor of the circuit being interrupted.

Figure 4:
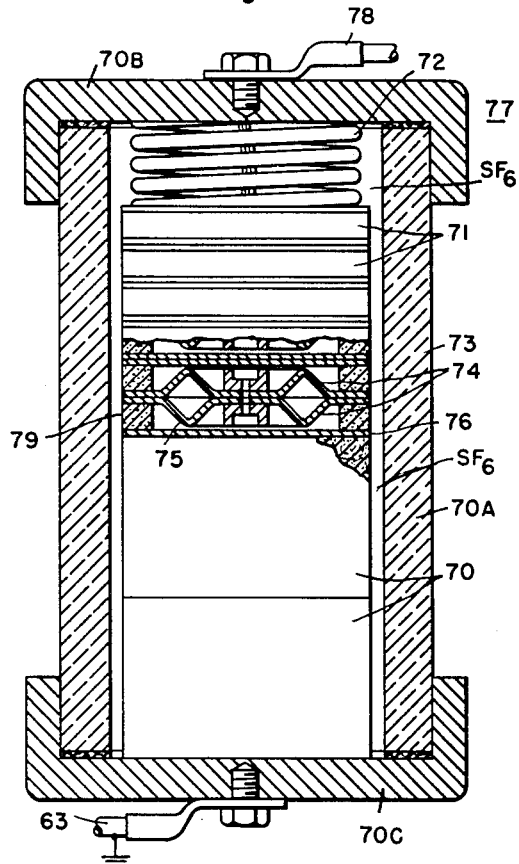
Fig. 4 shows a lightning arrester with a portion of the same broken away to indicate the construction of the internal gaps.

For an illustration of the use of sulfur hexafluoride gas for facilitating arc extinction in the lightning arrester gaps in a lightning arrester, reference should be had to Fig. 4. As shown in Fig. 4, the arrester 77 comprises a sealed casing including a porcelain cylinder 70A, and a pair of sealing end caps 70B and 70C, within which are two silicon carbide blocks 70 (having non-linear resistance characteristics) in series with the plurality of lightning arrester gaps, each generally designated by the reference character 71. A compression spring 72 biases the gaps 71 together to prevent excessive movement thereof within the casing 73, and to insure good electrical contact between the arrester elements. Each gap 71 includes conducting electrodes 74 and 76, which may be of any suitable shape, separated by an annular spacer 79 of high-resistance, or insulating material, which determines the length of the gap space 75. The arrester 77 is filled with sulfur hexafluoride gas.

As well known by those skilled in the art, the lightning arrester 77 is used to protect electrical equipment from voltage surges resulting from lightning striking any part of the equipment. Preferably, the lower end of the lightning arrester 77 is grounded, as indicated, and the upper terminal 78 is connected to a transmission line, the high-voltage side of a transformer, or other equipment which may be struck by lightning. Normally, the lightning arrester 77 is insulating and passes no current. However, upon lightning striking the equipment protected by the arrester 77, a high-voltage surge will enter by conductor 78 and will cause breakdown of the gaps 75 and will cause a surge of current, which may be as high as 100,000 amperes, to pass through the high resistance silicon carbide blocks 70 and thence to ground.

Following the discharge of the high voltage surge, the upper terminal 78 returns to line potential and the silicon carbide blocks 70 increase in resistance, as a result of their non-linear resistance characteristics, and the remaining current, which may be of the order of from 50 milliamperes to several amperes, will be readily interrupted at the next current zero at the gaps 75. The sulfur hexafluoride gas within the gap spaces 75 will readily interrupt the power follow current, and the arrester will return to its normal condition of allowing no current flow therethrough. Certain features relating to the gap construction are set out in United States Patent 2,238,619, by W. E. Berkey, issued April 15, 1941, and entitled "Spark Gap Device."

Figure 5:
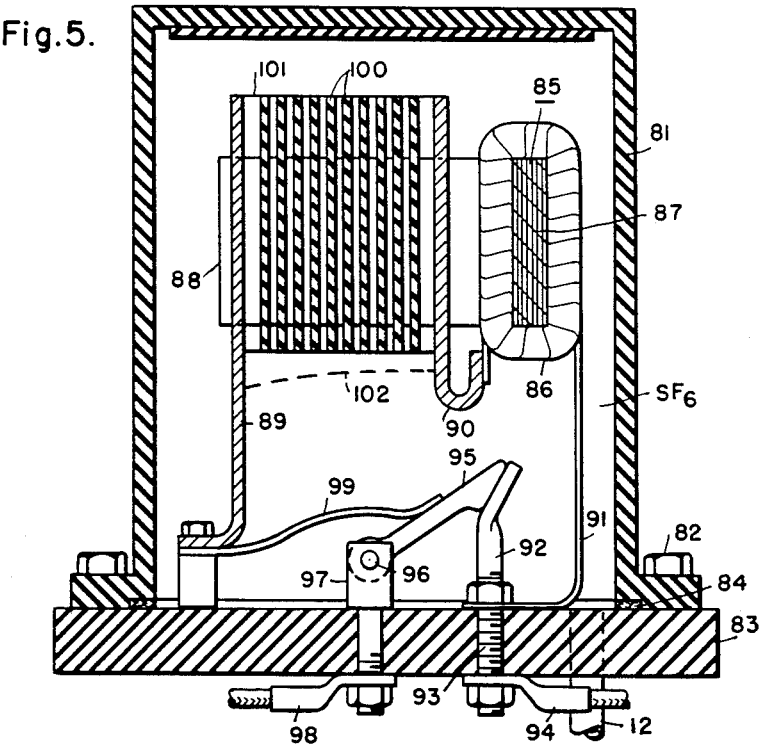
Fig. 5 is a modified type of circuit interrupter, the contact structure being shown in the closed-circuit position.

Fig. 5 shows a magnetic type circuit interrupter using sulfur hexafluoride gas, and employing insulating arc splitter plates. Referring to Fig. 5, it will be observed that there is provided a cup-shaped insulating enclosure 81 attached by bolts 82 to a base plate 83, gas-tight gaskets 84 being disposed between the base plate and enclosure 81, the assembly thereby being hermetically sealed.

Within the enclosure is a U-shaped magnetic member 85, with a blowout coil 86 encircling a yoke portion 87 of the magnetic member 85. Only one pole plate 88 of magnetic member 85 is shown. Between the pole plates 88 are a pair of arc horns 89, 90, the arc horn 90 being electrically connected to one end of the coil 86. The other end of the coil 86 is connected by a strap connection 91 to a stationary contact 92 of the interrupter. The stationary contact 92 has a shank portion 93 extending through the base plate 83, to which an external line connection 94 is fastened.

Cooperable with the stationary contact 92 is a movable contact 95, which is mounted on an operating shaft 96 hingedly connected to a bifurcated bracket 97, the latter also extending through the base plate 83 and having a line terminal 98 connected thereto. The shaft 96 may be rotated externally of the casing 81 by any suitable means, either manually or automatically to rotate the movable contact 95 to open and closed-circuit positions. A flexible strap 99 connects the movable contact 95 to the arc horn 89.

Preferably, we employ in this embodiment of our invention insulating arc splitters 100, composed of the fluorinated polymers previously disclosed, spaced apart and having their side edges secured to a pair of lengthwise extending insulating side plates 101, by cement or otherwise.

During the opening operation, a crank is employed to rotate the shaft 96 counterclockwise, which effects separation between the stationary and movable contacts 92, 95 to draw an arc therebetween. The arc, which is drawn therebetween, strikes the arc horn 90, and, because of the shunt path through the coil 86, the arc portion extending between the stationary contact 92 and the arc horn 90 is extinguished. The terminal of the remaining arc, attached to the movable contact 95, soon attaches to the left-hand arc horn 89, so that the resulting arc, indicated by the reference character 102, moves upwardly under the influence of the transverse magnetic field into engagement with the lower ends of the arc splitters 100. The combination of sulfur hexafluoride gas and the arc splitters readily interrupts the arc 102. The combination will produce unusually effective arc interruption.

Figure 6:
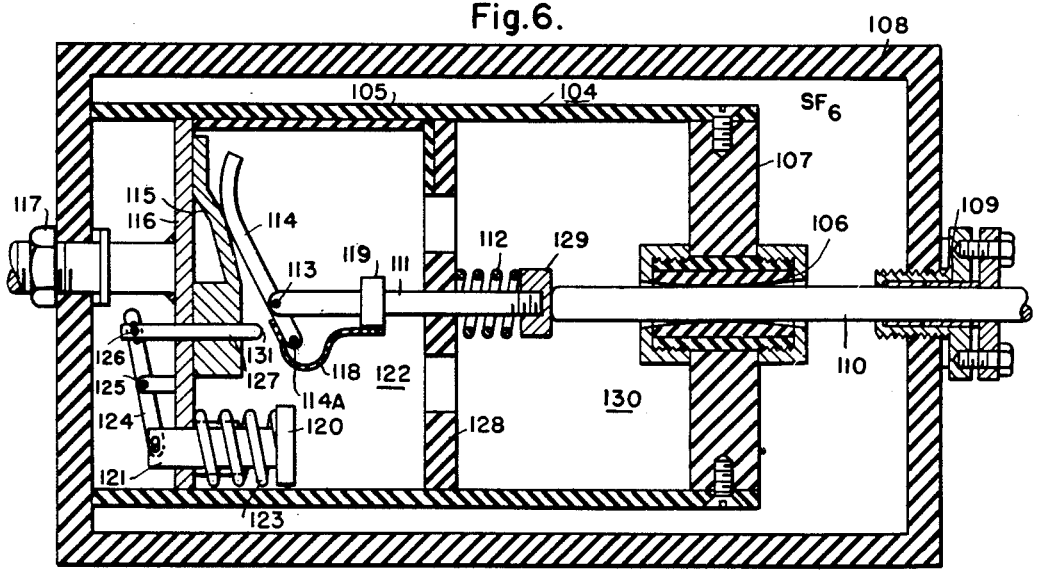
Fig. 6 is a still further modified type of double-break circuit interrupter employing pressure-generating and interrupting breaks, with means for preventing excessive pressure at the pressure-generating break.

In the interrupter shown in Fig. 6, there is provided an explosion chamber, generally designated by the reference character 104, which includes an insulating cylinder 105. An orifice member 106 is secured, as shown, to an end plate 107 fastened to the end of the cylinder 105. As shown, explosion chamber 104 is disposed interiorly within a sealed casing 108, and an externally movable contact rod 110 passes through a bushing 109 in the casing. The explosion chamber 104 and casing 108 are filled with sulfur hexafluoride gas. The movable contact rod 110 strikes an intermediate contact 111, spring-biased in an opening direction by a compression spring 112. At the left-hand end the intermediate contact 111 is pivotally connected, as at 113, to a rotatable arc horn 114, which is fixedly mounted for rotation about a pivot 114A fixed to the cylinder 105, and makes abutting engagement, as shown, against a stationary arc horn 115. The stationary arc horn 115 is secured, as by welding, to a conducting plate 116 which, in turn, may be welded to a stationary line terminal stud 117. A flexible strap 118 interconnects the movable arc horn 114 with a stop 119, secured to and movable with the intermediate contact 111.

A piston 121, which is slidably mounted in the conducting plate 116, slidably extends into a pressure-generating chamber 122. The piston 121 is provided with a flanged head 120 to seat a compression spring 123 to bias the piston into the chamber 122.

Pivotally connected to the other end of the piston 121 is a lever 124, pivotally connected at a fixed fulcrum point 125, as shown, and pivotally connected at its upper end, at 126, to an arc-shortening contact rod 127 having an arcing tip 131.

The operation of this modified form of our invention will now be described. During the opening operation suitable means, not shown, causes rightward opening movement of the movable contact rod 110. This permits following movement of the intermediate contact 111 under the influence of spring 112, thereby causing separation of the movable arc horn 114 away from the stationary arc horn 115 establishing an arc therebetween, which heats the sulfur hexafluoride gas and generates pressure within the chamber 122. After the stop 119 strikes the perforated plate 128, further rightward opening movement of the movable contact rod 110 causes separation therefrom from the cap 129, fixed to the intermediate contact 111, to establish an interrupting arc therebetween within the outer chamber 130. As the end of the contact rod 110 passes through the orifice member 106, the interrupting arc is finally drawn through the orifice member 106 and is subjected to a blast of sulfur hexafluoride gas under pressure.

Should there occur pressure greater than desired within the pressure-generating chamber 122, the piston 121 will be moved toward the left, against the bias exerted by the compression spring 123, to thereby effect rightward shorting movement of the contact rod 127. The left-hand terminal of the pressure-generating arc will then transfer from the stationary arc horn 115 to the tip 131 of the contact rod 127 to thereby shorten the length of the pressure-generating arc, and consequently will reduce the pressure existing within the pressure-generating chamber 122.

Thus, in this form of our invention we have disclosed not only a two-break sequential arc drawing arrangement in conjunction with an explosion pot 104, but have also indicated a means for preventing unduly excessive gas pressure being generated within the pressure-generating chamber 122.

Figure 7A:
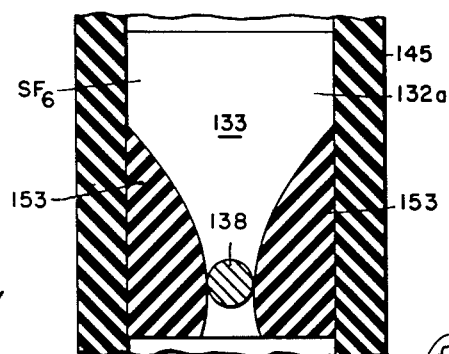
Fig. 7a is a fragmentary vertical sectional view taken along the line VIIa—VIIa of Fig. 7.
Figure 7:
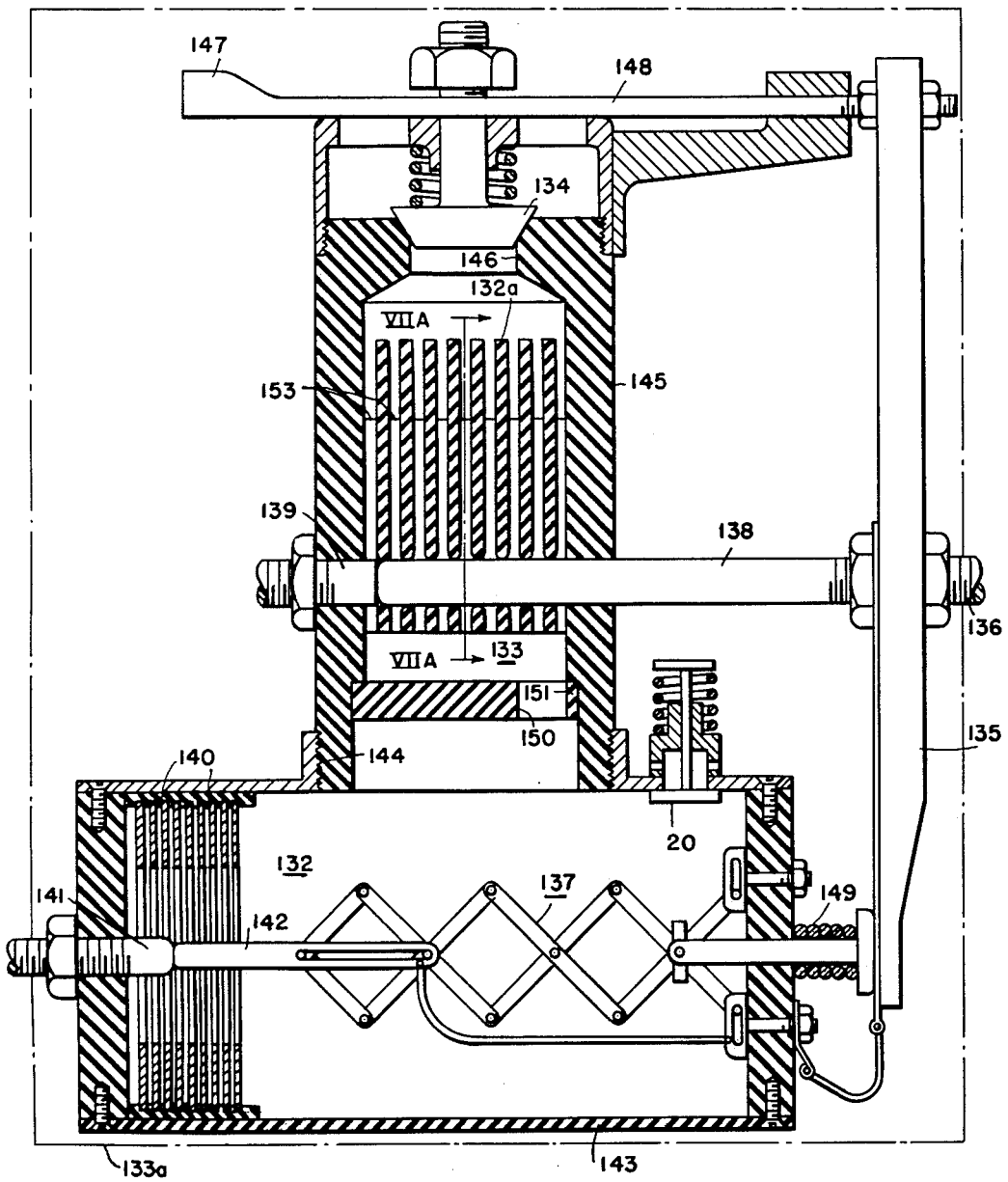
Fig. 7 is a modified type of circuit interrupter, the contact structure of which is shown in the closed-circuit position.
Figure 12:
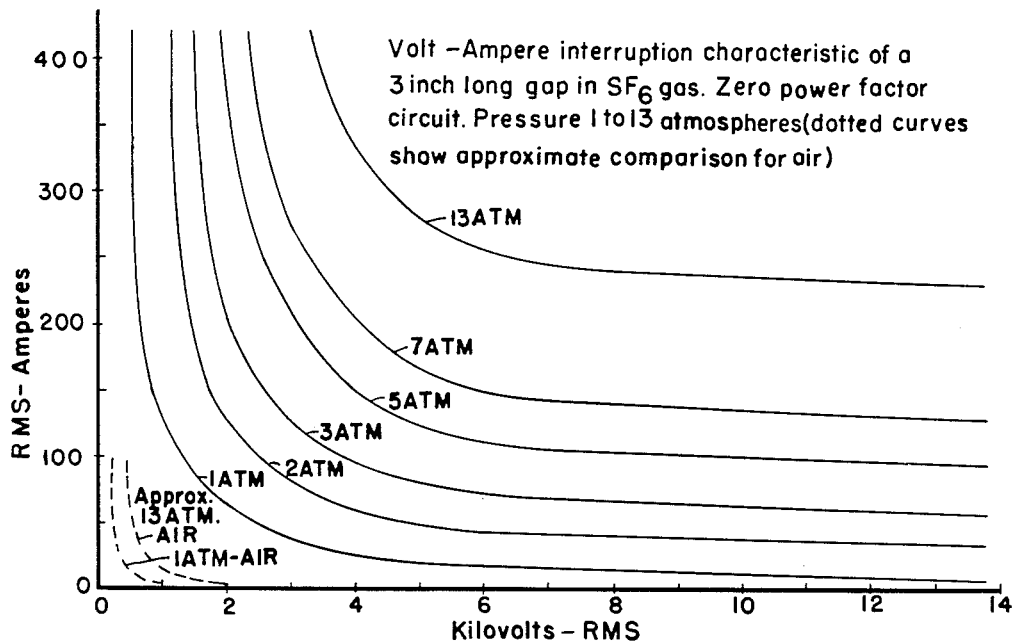
Fig. 12 is a graph showing the volt-ampere interruption characteristics of a three-inch long gap in still sulfur hexafluoride gas at zero power factor, at different absolute pressures of the gas. The graph also shows a plain break interruption characteristic in still air at 1 and 13 atmospheres absolute pressure.

Fig. 7 indicates a modified form of our invention in which there is provided a pressure-generating chamber 132, an interrupting chamber 133, and a cam-operated or pressure actuated valve 134 disposed at the exhaust side of the interrupting chamber 133. A yoke bar 135, moved by an actuating rod 136, causes establishment of a pressure-generating arc between contacts 141—142 within the pressure generating-chamber 132 by a motion multiplying lever system, in this instance including a pantograph 137, or a lazy-tong arrangement.

A movable interrupting contact 138 is affixed to and movable with the yoke 135, and it separates from a stationary interrupting contact 139 to draw an interrupting arc therebetween. A plurality of ring-shaped copper cooling plates 140 are provided adjacent the stationary and movable pressure-generating contacts 141, 142 to cool the arc gases. The pressure-generating chamber 132 comprises an insulating cylinder 143, the top portion of which opens at 144 and is threadedly connected at this point to an upstanding insulating cylinder 145. The upper end of the insulator cylinder 145 has an exhaust opening 146 closed by the valve 134 which is spring-biased to close the opening 146, the valve 134 being forced open by a cam portion 147 of a control rod 148 on low currents, or opened prior to this time on high currents by gas pressure in chamber 133. The right-hand end of the control rod 148 is fixed to the yoke 135. Both the pressure-generating and interrupting chambers 132, 133 are disposed within an outer hermetically sealed chamber 133a diagrammatically represented. The chambers 132, 133 and 133a are filled with sulfur hexafluoride gas.

To open the breaker, the actuating rod 136 is moved by any suitable means toward the right, being assisted in this motion by the biasing action exerted by a spring 149. This rapidly establishes a pressure-generating arc between contacts 141—142 by the multiplying action of the pantograph 137. The arc will generate pressure in the surrounding sulfur hexafluoride gas, which gas will flow upwardly through an aperture 150 provided in a partition plate 151, separating the pressure-generating and interrupting chambers 132, 133.

Substantially simultaneously with the establishment of the pressure-generating arc there occurs establishment of the interrupting arc within the interrupting chamber 133 between the stationary and movable interrupting contacts 139, 138. This interrupting arc is blown by the upward gas flow passing through the aperture 150 upon opening of the valve 134 at a predetermined pressure, and is forced against the side edges of apertured splitter plates 132a composed of insulating material. The apertured splitter plates 132a are spaced laterally apart by pairs of spacers 153, more clearly shown in Fig. 7a. The arc, enveloped in sulfur hexafluoride gas and being forced against the edges of the splitter plates, is soon extinguished. When low electrical currents are being interrupted, opening of the valve 134 is accomplished at a desired time by the cam 147, since there is insufficient pressure generated within the pressure-generating chamber 132 under such circumstances. Interruption of the interrupting arc between contacts 138, 139 soon occurs, and the circuit is thereby interrupted. After a circuit interrupting operation, the pressure within the pressure-generating and interrupting chambers 132, 133 will fall, and a valve 20 will be opened by the differential gas pressure, and will bring about a substantial equalization of pressure within and without the insulating cylinder 143.

In the embodiment of our invention shown in Fig. 8, there is provided an enclosure 155 secured to a base plate 156, gasket means 157 being provided to insure a tight seal. Sulfur hexafluoride gas is disposed within the enclosure 155. A movable contact 158 and a movable arcing contact 159 are integrally formed with a movable contact arm 160, the latter being pivotally mounted at 161 to a bracket 162, the latter being affixed by any suitable means to the base plate 156. A series coil 163 is provided to trip the breaker open upon excessive current flow therethrough. The upper end 164 of the overload coil 163 is connected to the conducting bracket 162, whereas the lower end 165 of the series overload coil 163 is connected to a stationary terminal stud 166 to which a line connection may be made. A toggle 167, including a toggle link 168 and a toggle link 169, is provided to effect the closing of the movable contact arm 160 in opposition to the biasing action exerted by an accelerating compression spring 170.

The toggle link 169, as more clearly shown in Fig. 10, is fixedly secured to the inner extremity of a shaft 171 which extends through the side wall of the enclosure 155, and is externally actuated by a manually operated arm 172 (Fig. 10).

The toggle link 169 has an integrally formed latch arm 177 which is maintained in the closed position, as shown in Fig. 8, by the nose 178 of a pivotally mounted holding latch 179. The holding latch 179 is pivotally mounted at a stationary pivot at 180, and has a lower actuating arm 181, which is engageable by the armature 182 of the magnetic circuit 183 of the overload relay 184.

Thus, consequently, should there occur an excessive current flow through the series overload relay 184, the armature 182 will be attracted to the core 185 and will strike the lower end of the tripping arm 181 of the holding latch 179 to thereby effect release of the toggle 167. The compression spring 170 will then be able to effect opening of the movable contact arm 160, first with separation between the stationary contact 186 and the movable contact 158, and secondly separation between the pivotally mounted stationary arcing contact 187 and the movable arcing contact 159 to establish an arc between the latter two contacts. This arc, of course, will be established within the enclosure 155 containing the sulfur hexafluoride gas, and will be rapidly extinguished within this medium.

To enable an operator to effect a manual tripping of the breaker, we have provided a manually operable button 188 disposed externally of the casing 155 to effect manual tripping of the arm 181. This button 188 is secured, as by welding, near its inner extremity to a Sylphon bellows 173, which is normally compressed by the pressure of the sulfur hexafluoride gas within the enclosure 155. A compression spring 174 disposed within the bellows 173 tends to effect expansion of the same. In case there is a leakage of sulfur hexafluoride from casing 155, a reduction of gas pressure within the chamber 155 below a desirable amount will permit the spring 174 to extend the bellows 173 and thereby effect tripping of the breaker. This is a safety feature bringing about opening of the circuit when there is insufficient sulfur hexafluoride present so that the operator will investigate and determine that it needs servicing.

Fig. 9 represents an embodiment of our invention comprising a gas-blast breaker utilizing sulfur hexafluoride stored under pressure, and the breaker having an enclosure 189 provided for preventing escape of the sulfur hexafluoride gas during the interrupting operation. A blast tube 190 enters the enclosure 189 at the lower end thereof, being connected to a reservoir tank 191 containing the sulfur hexafluoride gas, preferably under pressure. A blast valve 192 is provided, being operable by an actuating link 193, which may be operated in synchronism with opening motion of an operating rod 194 connected to a pivotally mounted movable contact arm 195. At the upper extremity of the movable contact arm 195 is a movable contact 196 cooperable with a stationary contact 197. The latter is connected to a terminal stud 198 passing through the enclosure 189, and to which an external line connection may be made.

The movable contact arm 195 is pivotally connected, at 199, to a bifurcated bracket 200, the latter protruding externally of the enclosure 189 to form a second terminal stud 201, to which likewise a line connection may be made.

Associated with the movable and stationary contacts 196, 197 is an arc chute, generally designated by the reference character 202, and including a plurality of slotted insulating arc splitters 203. A blast of sulfur hexafluoride gas passing upwardly through the interior of the blast tube 190, upon opening motion of the blast valve 192, as indicated by the arrows 204, will effect an upward blasting action upon the arc established between the contacts 197, 196, forcing this arc upwardly into the slots 205 of the arc splitters 203 effecting rapid extinction thereof. The sulfur hexafluoride gas which exhausts out of the arc chute 202 into enclosure 189 is drawn through a conduit 206 into a compressor 207 where it is put under pressure and returned by way of a conduit 208 to the reservoir 191, where it may be subsequently used in later interrupting operations. To protect the closed system against corrosive gases which may be produced by the action of the arc on the sulfur hexafluoride extinguishing medium, a chamber 209, containing an absorbing substance such as activated alumina, activated carbon, or silica gel, may be serially inserted in the gas circulating system.

Thus, Fig. 9 shows an application of the use of sulfur hexafluoride gas under pressure to take the place of air, which is customarily used in compressed air breakers, but instead of letting the gas escape and be lost, as is done with the compressed air in compressed air breakers, in our interrupter, as shown in Fig. 9, the gas is saved and recompressed in the compressor 207 to be used over and over again.

Figure 13:
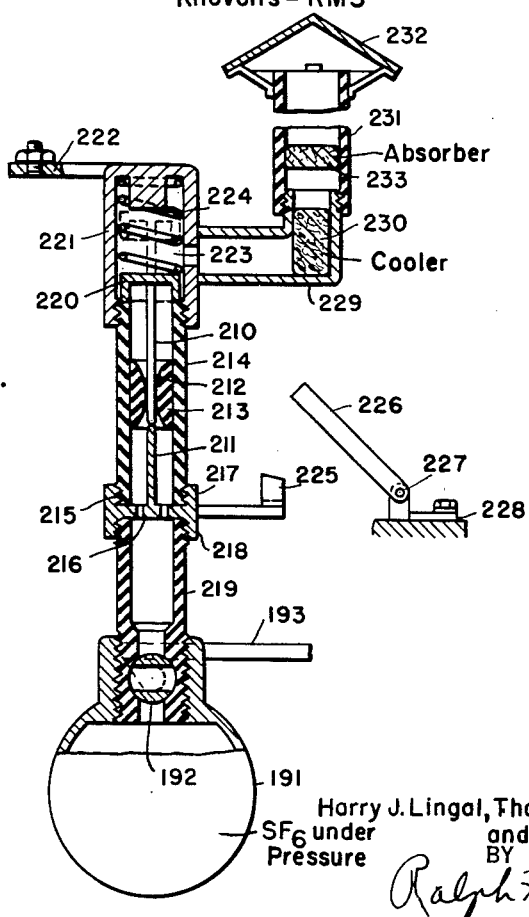
Fig. 13 illustrates a gas blast type of circuit interrupter utilizing sulfur hexafluoride gas, the contact structure being shown in the closed-circuit position.

In the embodiment of our invention illustrated in Fig. 13, we show an axial blast circuit interrupter having certain features identical to those previously disclosed in connection with the gas blast breaker of Fig. 9. Thus a reservoir tank 191 containing sulfur hexafluoride gas under pressure, is utilized. Also, a blast valve 192 operated by an actuating link 193 is provided, as was the case in the interrupter of Fig. 9.

It will be noted, however, that in the interrupter of Fig. 13, the arc, which is established between a movable contact 210 and a stationary contact 211, is drawn axially through the bore 212 of an insulating orifice member 213. The contact 210 is slightly spaced from the walls of the orifice member 213 to permit sulfur hexafluoride gas to pass by. The orifice member 213 may be secured by a press fit within an insulating blast tube section 214, the lower end of which is threadedly secured, as at 215, to a conducting perforated spider 216. The conducting spider 216 has upper and lower flange portions 217, 218 which are respectively secured to the blast tube section 214 and to a lower blast tube section 219.

It will be observed that the movable contact 210 is affixed to a piston 220 which moves axially within a conducting operating cylinder 221, at the upper end of which is secured a line terminal 222. The operating cylinder 221 has an opening 223 which is uncovered upon sufficient upward movement of the piston 220. A compression spring 224 is provided to bias the piston 220 downwardly, and hence the contact structure, to the closed circuit position.

Associated with the conducting spider 216 is a stationary disconnect contact 225 cooperable with a movable disconnect blade 226, the latter being rotatably mounted, as at 227, on a terminal plate 228, to which a line connection may be made.

The exhaust opening 223 leads into a chimney 229 within which is disposed a cooler 230 consisting of copper wool, or other cooling material. The chimney 229 has an upper insulating section 231 associated therewith which may extend upwardly through the roof of the building, in which the interrupter is utilized. A rain shed 232 may be secured to the upper end of the chimney extension 231 to prevent rain, snow, or sleet from falling within the interior of the chimney extension 231.

As was the case with the interrupter of Fig. 9, we provide an absorber 233 for removing any corrosive gases that might have been formed as a result of the arc reacting upon the sulfur hexafluoride gas. Activated alumina may, as an example, be used in the absorber.

The operation of the interrupting device is as follows. Upon opening the blast valve 192 by operation of the actuating link 193, sulfur hexafluoride gas under pressure passes upwardly through the blast tube section 219, past the spider 216, and through the orifice member 213 to act upwardly upon the movable piston 220. When the gas pressure below the piston 220 is sufficient to raise it, in opposition to the biasing action exerted by the compression spring 224, the contacts 210, 211 will become separated and will draw an arc axially through the bore 212 of the insulating orifice member 213.

The blast of sulfur hexafluoride gas passing upwardly through the orifice member 213 will rapidly extinguish the arc drawn between the contact structure, and the gas will exhaust outwardly through the exhaust opening 223 which will have been uncovered at this time by upward displacement of the piston 220. Any arc flame will be cooled by the copper wool within the cooler 230, and any corrosive gases will be absorbed in the absorber 233. The remaining gas will be exhausted to atmosphere out through the upper extension 231 of the chimney.

In order to maintain the electrical circuit open upon closure of the blast valve 192, the serially related disconnect switch 225, 226 is provided. Thus upon closure of the blast valve 192, the compression spring 224 will effect closure of the contact structure, and the disconnect switch blade 226 may be maintained in its open position to cause the electrical circuit to remain open even though the contact structure within the interrupter has been closed.

Thus, in this embodiment of our invention we show an application of the use of sulfur hexafluoride gas under pressure in an axial blast type of circuit interrupter, in which the sulfur hexafluoride gas may be freely exhausted to atmosphere through a suitably provided chimney, the latter leading up, for instance, through the roof of the building which houses the interrupter.

We have discovered that the results obtained using sulfur hexafluoride gas as an arc interrupting medium in these various circuit interrupters are phenomenal. We have found that sulfur hexafluoride gas, in tests of a plain break, three inch long gap at constant voltage is in the order of 100 times as effective as air in extinguishing electrical arcs. It was further discovered that arcs in sulfur hexafluoride would interrupt at rates of restored voltage rise of at least 100 times the limiting values for interruption of arcs in air. It was also observed that on the same voltage circuits, about 100 times as much current could be interrupted in sulfur hexafluoride as in air. These are very surprising results, not at all indicated by the slight differences in dielectric strength of the sulfur hexafluoride gas over air. If sulfur hexafluoride only exhibited better arc interrupting properties, compared to air, in proportion to its dielectric strength difference over air, it would not be of interest for use in commercial circuit interrupters, because the added complication of hermetically sealed enclosures and other factors would counterbalance any slight advantages it would have had over air breakers.

Our discovery of the unexpected arc-interrupting properties of sulfur hexafluoride has enabled the making of simple, rugged, totally enclosed circuit interrupters many times smaller than previously available complicated air or oil switches. Circuit interrupters produced in accordance with the present invention are opening new fields of application for circuit interrupters. For example, small loadbreak disconnecting switches made in accordance with the invention will replace oil-break circuit interrupters. Due to the small size and lower cost for a given rating, the invention will greatly affect the design and construction of substations and other electrical distribution systems.

Another unexpected property we have discovered is that whereas the arc interrupting ability of air increases slightly with arc or gap length between contacts, in sulfur hexafluoride the arc interrupting ability for gaps of one inch and more is almost directly proportional to gap length. This makes it readily possible to improve further the interruption in sulfur hexafluoride, as compared to air, by the simple expedient of elongating the arcs in sulfur hexafluoride by magnetic or other means.

Still another unexpected property we have discovered is that the current or voltage interrupting ability of plain break arcs in sulfur hexafluoride gas increases almost directly with the absolute pressure, whereas in air the arc interrupting properties improve only slightly with increase in pressure. Hence, either the current or the voltage interrupting limit of a plain break arc in sulfur hexafluoride can be multiplied by a factor of, say 10, by simply increasing the pressure of the sulfur hexafluoride in the switch chamber from 1 to 10 atmospheres.

Over and beyond the hundred-fold arc-interrupting superiority of sulfur hexafluoride to air in a plain break interrupter, we have found that an astonishing further increase in arc-interruption of the order of two hundred times may be secured by blowing the sulfur hexafluoride through an arc. In other words, by blowing sulfur hexafluoride through an arc, we are able to interrupt 20,000 times the amperage that can be interrupted by still air in a similar interrupter, both at the same voltage. For example, an arc was drawn through a 0.6 inch orifice with gas flow through the orifice produced by a 2¹¹⁄₁₆ inch diameter puffer piston connected to the moving contact which produced less than 5 lbs. per square inch differential gas pressure at the orifice. This puffer breaker showed an increased interrupting ability of 200 times over a 3 inch long plain break arc in sulfur hexafluoride. The increase in current interrupting ability of this breaker was 40 times that of air when sulfur hexafluoride was substituted for the air at one atmosphere pressure. When a somewhat more effective orifice was substituted in this breaker, the breaker interrupted 4 times as much current at one atmosphere of sulfur hexafluoride gas as did the first orifice. This indicates that the improvement in arc interrupting capacity under turbulent flow conditions is well over 40 times that of air, and may be in the order of 100 times as great as air.

A series of tests was run on a puffer type interrupter comprising a porcelain cylinder having an inside chamber 18 inches long by 5 inches diameter in which was disposed the contacts and puffer piston, the maximum contact separation being 6¼ inches, the chamber being filled with sulfur hexafluoride at one atmosphere pressure. The interrupter operated successfully in extinguishing arcs of up to 1830 amperes at 81,700 volts. With 2 atmospheres of sulfur hexafluoride present in this interrupter, successful arc interruptions were had up to 3100 amperes at 90,000 volts. In all these tests the gas flow of the sulfur hexafluoride was produced by less than 5 p. s. i. pressure differential at the orifice. With higher flows of sulfur hexafluoride, even greater interrupting ability would be exhibited.

In order to summarize the established improvements of the present invention, the following table is presented. As a basis for comparison, the current interrupting ability of a 3 inch long arc in air is rated as unity:

| Type of Arc | Interrupting Ability |
| --- | --- |
| 3 inch long arc in air (plain break) | 1 |
| 3 inch long arc in sulfur hexafluoride (plain break) | 100 |
| Puffer in air | 500 |
| Puffer in sulfur hexafluoride | 20,000 |

Since flow type interrupters in sulfur hexafluoride atmospheres can interrupt arcs at extremely high voltages at one atmosphere pressure or even less, it is not necessary to maintain high gas pressures in flow type interrupters with this gas, whereas, with air, high gas pressures are necessary. However, considerable improvement in current interrupting ability is obtained when the sulfur hexafluoride is maintained at pressures above atmospheric. The voltage interrupting ability goes up, for the same current, approximately directly with the absolute pressure.

In another series of tests a relay small enough to fit in an enclosure 3¾ inches in diameter by 5½ inches long, was filled with sulfur hexafluoride gas at one atmosphere and this relay interrupted well over 100 times the normal rating of 3 to 5 amperes at 383–460 volts in air. Further multiplication of the arc interrupting effectiveness of sulfur hexafluoride gas may be achieved by combinations of gas flow, arc elongation, static pressure increase, and shunting.

Gas deterioration due to arcing has been found to be negligible. Mass spectograph analyses have failed to show appreciable changes in gas composition even after long periods of high current arcing in small quantities of gas. Some metal fluorides are formed by combination with the vaporized metal of the contacts, but these metal fluorides prove to be soft powders which are very good insulators. However, the contact resistance does not increase appreciably since the metal fluorides do not adhere to the contact surfaces. In a hermetically sealed breaker no change in sulfur hexafluoride gas pressure or in gas density could be measured after over 100 arcs at a current of 500 R. M. S. amperes were drawn to a length of 3 inches and allowed to arc for 5 half cycles each in a 5.5 liter sulfur hexafluoride gas volume. Also, no deterioration in interrupting efficiency was observed after long periods of arcing in the same gas. This indicates that hermetically sealed breakers filled with sulfur hexafluoride may be used for thousands of operations.

While we have secured the best results with an arc-interrupting gas composed of sulfur hexafluoride alone, small quantities of one or more other gases may be admixed therewith, over 50% of the gas preferably being sulfur hexafluoride. Examples of such added gasses are air, nitrogen, hydrogen, argon, helium, and carbon dioxide.

As an example of the fact that certain gases may be admixed with sulfur hexafluoride with beneficial results, reference is directed to Fig. 19 of the drawings. Fig. 19 shows the interrupting performance of a mixture of 50% air and 50% sulfur hexafluoride at two voltages, namely 2,300 volts and 13,800 volts compared with the performance of 100% sulfur hexafluoride gas at 2,300 volts and 13,800 volts. The curve for 100% air at 2,300 volts is indicated. From these curves, it is apparent that even with air mixed in an equal amount with the sulfur hexafluoride gas, nevertheless beneficial results are obtained and the performance is considerably better than that with 100% air.

While the high dielectric strength of sulfur hexafluoride is a beneficial property, it is not the property of chief importance for alternating-current circuit interruption. Of chief importance for the quenching or extinction of an alternating-current arc is the ability of the conducting arc gas to lose its conductivity and recover its normal dielectric strength very rapidly as the arc current passes through a zero value. As compared with air, sulfur hexafluoride, for example, shows a characteristic rate of dielectric recovery more than one hundred times as great. In many circuit interrupting situations of great practical importance, this also means a possible hundred-fold increase in interrupted current magnitudes.

The reason or reasons for this extraordinarily rapid dielectric recovery of $SF_6$ and related gases have not been definitely determined. Based on what information we have, certain surmises and theoretical deductions can be made. The ability of an arc column to carry hundreds or thousands of amperes per square centimeter at voltage gradients of only tens or hundreds of volts per centimeter must be due to a plentiful supply both of free electrons to transmit the current and of positive ions to neutralize the space charge which would otherwise be produced by the electrons. This difference in function between electrons and positive ions results from their very great difference in mass and hence in mobility. Electrons have mobilities and hence velocities many hundreds of times those of the positive ions of most gases. In the absence of large voltage gradients in a highly ionized gas, the laws of electrostatics show that the average densities of positive and negative charge must be nearly equal, and hence that the numbers per unit volume of positive and negative singly charged particles must be nearly equal. Under this condition, it is clear that if the negative charge carriers are free electrons, these highly mobile electrons will carry all but a fraction of a percent of the current.

During the dielectric recovery period just after a current zero, the still ionized arc gas between relatively cool metallic electrodes almost instantly loses most of its conductance because of the formation at the electrodes of space charge sheaths where high gradients can exist with small current flow. In the usual case, these sheaths are very thin but absorb practically all of the immediately reapplied voltage. Because the sheaths are so thin, they can withstand only a few hundred total volts initially. Further dielectric recovery occurs only as the ion density diminishes in the nearly field free space outside the sheaths by diffusion and recombination, leading to growth of the sheath thickness for a given applied voltage. Electrostatic effects limit the rate of diffusion essentially to that of the more massive and slower moving positive ions. For long arc columns surrounded by cooler gas, diffusion simply aids deionization by permitting the ions and electrons to reach the cooler boundary regions where recombination is easier. Recombination occurs at a usefully rapid rate only between positive and negative ions with comparable masses. Hence, an essential first step in the process is capture of the electrons by neutral molecules or atoms to form negative ions. This electron capture is generally considered to be impossible at atmospheric arc temperatures, occurring in the cooler boundary regions only. Here it is still probably the process which limits the rate of recombination.

Against this briefly sketched background of conventional theory, a possible explanation for the hundred-fold increase in rate of dielectric recovery for arc spaces in $SF_6$ may be seen. Sulfur hexafluoride apparently has an exceptionally high affinity for electrons, being highly "electronegative." Comparatively little is known about this unusual tendency of the sulfur hexafluoride to absorb electrons and form negative ions, which tendency is far higher, easily 100 times or more, than exhibited by ordinary gases like oxygen which by itself furnishes most of the negative ions formed in air. That this attachment process is apparently the "bottleneck" in the recombination process leading to voltage recovery is well illustrated by the case of pure nitrogen gas, which though a slightly better insulator than air, is a very much poorer arc extinguishing medium, exhibiting very slow dielectric recovery. In correlation with this, nitrogen is one of the gases which fails to form negative ions. Because this attachment process is so important, it is not unreasonable to expect that sulfur hexafluoride with exceptionally high electron affinity should have exceptionally high rates of dielectric recovery.

According to our theory regarding the behavior of sulfur hexafluoride, accelerated recombination, which can also affect ion density gradients and so rates of diffusion, should accelerate the growth of the space charge sheaths at the electrodes and thereby accelerate overall dielectric recovery of an ionized arc space between metallic electrodes. However, a still further effect is possible if it be presumed that electron attachment can occur within the arc core itself at temperatures only slightly below the arc burning temperature. If all of the free electrons within the arc core should quickly become attached to form relatively immobile ions, the conductivity of this much larger region would be reduced to the same order as that of the space charge sheaths, and hence large voltage gradients could also exist in this region even at the small space-charge-limited currents, again without the space being completely deionized. Such gradients, existing over comparatively large distances, could easily account for most of the very rapid dielectric recovery by arc spaces of considerable length in these gases.

It is apparent that this rapid recovery of dielectric strength is essentially a different effect from the elevation in static dielectric strength of sulfur hexafluoride in the initially un-ionized state, and that sulfur hexafluoride therefore performs an essentially different function in aiding the extinction of an alternating-current arc from that of mere improvement in insulation.

Although we have shown and described specific structures in combination with a particular gas, it is to be clearly understood that the same were merely for the purposes of illustration and that changes and modifications may readily be made therein without departing from the spirit and scope of the appended claims.

We claim as our invention:

1. A circuit interrupter including as an arc extinguishing medium a gas comprising sulfur hexafluoride, means for establishing an arc in contact with said medium, and said medium effecting extinction of the arc.

2. A circuit interrupter including means for establishing an arc, means for forcing a blast of gas against the arc to effect the extinction thereof, and the gas comprising sulfur hexafluoride.

3. A circuit interrupter including an enclosure containing sulfur hexafluoride gas, means for establishing an arc within the enclosure, and the sulfur hexafluoride gas being capable of effecting extinction of the arc.

4. A circuit interrupter including an enclosure containing sulfur hexafluoride gas, means for establishing an arc within the enclosure, and means for forcing the sulfur hexafluoride gas against the arc to effect the extinction thereof.

5. A circuit interrupter including an enclosure, means providing an orifice therein, means for establishing an arc adjacent the orifice, means for forcing gas through the orifice into engagement with the established arc to effect the extinction thereof, and said gas comprising sulfur hexafluoride.

6. A circuit interrupter including an enclosure, contact means for establishing an arc within the enclosure, a plurality of spaced arc splitters, means for causing the arc to be moved against the plurality of arc splitters, the enclosure containing a gas comprising sulfur hexafluoride, and the sulfur hexafluoride gas cooperating with the arc splitters to extinguish the arc.

7. A circuit interrupter including an enclosure containing a substantial proportion of sulfur hexafluoride gas, means for establishing a pair of serially related arcs within said enclosure, and means to cause gas pressure generated at one of the arcs to send a flow of the gas adjacent the other arc to effect the extinction of the latter.

8. A circuit interrupter including an enclosure, means for establishing a pressure-generating arc within the enclosure, means for establishing an interrupting arc within the enclosure, the enclosure containing a substantial proportion of sulfur hexafluoride gas, a plurality of adjacently disposed arc splitters disposed adjacent the interrupting arc, means utilizing the pressure developed at the pressure-generating arc to force the interrupting arc against the arc splitters, and the sulfur hexafluoride gas cooperating with the arc splitters to effect the extinction of the interrupting arc.

9. A circuit interrupter including a pressure-generating chamber and a vented interrupting chamber, both chambers containing a substantial proportion of sulfur hexafluoride gas, the interrupting chamber being pneumatically connected with the pressure-generating chamber, valve means for controlling the exhausting of gas from the interrupting chamber, means for establishing a pressure-generating arc within the pressure-generating chamber and an interrupting arc within the interrupting chamber, and means for actuating the valve means at a predetermined time in the opening operation to effect thereby a venting of the interrupting chamber to cause flow of the sulfur hexafluoride gases into contact with the interrupting arc to effect an extinction thereof.

10. A lightning arrester including one or more series gap elements, spacing means associated with each gap element and providing a relatively small gap space which may be broken down during a high voltage surge, and means utilizing a gas comprising sulfur hexafluoride for effecting the extinction of at least one arc disposed in the series gaps.

11. A circuit interrupter including an enclosure containing a gas comprising sulfur hexafluoride, means forming a pressure-generating chamber within said enclosure and an interrupting chamber, means for establishing a pressure-generating arc within the pressure-generating chamber and an interrupting arc within the interrupting chamber, means responsive to the pressure generated by the pressure-generating arc within the pressure-generating chamber for effecting a shortening of the pressure-generating gap upon the occurrence of excessive pressure, and means for causing the gas comprising sulfur hexafluoride to be ejected under pressure from the pressure generating chamber into the interrupting chamber to extinguish the arc.

12. A compressed gas circuit interrupter including an enclosure, means for establishing an arc within the enclosure, a plurality of arc spiltters disposed laterally of the arc, a reservoir containing gas comprising sulfur hexafluoride, and valve means for releasing a blast of said gas under pressure against the established arc to force the latter against the arc splitters to effect the extinction thereof.

13. A circuit interrupter including an enclosure containing a substantial proportion of sulfur hexafluoride gas, a stationary contact disposed within the enclosure, a movable contact carrying a piston and cooperable with the stationary contact to establish an arc, an operating cylinder within which the piston is movable, and the opening of the movable contact not only establishing an arc between the stationary and movable contacts, but also effecting working motion of the piston within the operating cylinder to effect a flow of the sulfur hexafluoride gas adjacent the established arc whereby to extinguish the arc.

14. A circuit interrupter including a reservoir of gas under pressure, said gas comprising sulfur hexafluoride, means for establishing an arc, and means for releasing a portion of said gas under pressure to effect extinction of the arc.

15. A circuit interrupter including contact means for establishing an arc, a plurality of spaced arc splitters, means for causing the arc to be moved against the plurality of arc splitters, means for applying a gas comprising sulfur hexafluoride against the arc, and the arc being extinguished by the joint cooperation of the arc splitters and the gas comprising sulfur hexafluoride.

16. A circuit interrupter including an enclosure containing a substantial proportion of sulfur hexafluoride gas, means for establishing a pair of serially related arcs within said enclosure, means defining an orifice disposed adjacent one of said arcs, and means enabling gas pressure generated at the other of said arcs to send a flow of the sulfur hexafluoride through the orifice adjacent the first-mentioned arc to effect the latter's extinction.

17. A circuit interrupter including an enclosure containing a substantial proportion of sulfur hexafluoride gas, a stationary contact, an intermediate contact and a movable contact disposed within the enclosure, a gas pressure-generating arc being established between the relatively stationary contact and the intermediate contact, an interrupting arc being established between the intermediate contact and the movable contact, and the gas pressure generated at the pressure-generating arc being used to send a flow of the sulfur hexafluoride adjacent the interrupting arc to effect extinction of the latter.

18. A circuit interrupter including an enclosure containing a substantial proportion of sulfur hexafluoride gas, a container disposed within said enclosure and including a pressure-generating chamber and an interrupting chamber, orifice means pneumatically connecting the interrupting chamber with the enclosure, means for establishing a pair of serially related arcs within said container with a pressure-generating arc being established within the pressure-generating chamber and an interrupting arc being established adjacent the orifice means, and the gas pressure generated at the pressure-generating arc being used to send a flow of the sulfur hexafluoride gas through the orifice means and adjacent the interrupting arc to effect extinction of the latter.

19. A circuit interrupter including a pressure-generating chamber and a vented interrupting chamber containing a substantial proportion of sulfur hexafluoride gas, the interrupting chamber being pneumatically connected with the pressure-generating chamber, valve means responsive to a predetermined pressure within the interrupting chamber for controlling the exhausting of gas from the interrupting chamber, means for establishing a pressure-generating arc within the pressure-generating chamber and an interrupting arc within the interrupting chamber, and the valve means being operable at said predetermined pressure to effect thereby a venting of the sulfur hexafluoride gas from the interrupting chamber to provide a flow of the sulfur hexafluoride gas adjacent to the interrupting arc whereby it is extinguished.

20. A compressed gas circuit interrupter including an enclosure, means for establishing an arc within the enclosure, a reservoir containing gas comprising sulfur hexafluoride under pressure, and blast valve means for releasing a blast of said sulfur hexafluoride gas under pressure against the established arc to effect the extinction thereof.

21. A circuit interrupter of the gas-blast type including a reservoir containing gas comprising sulfur hexafluoride under pressure, orifice means, means for establishing an arc through said orfice means, and blast valve means for releasing a portion of said sulfur hexafluoride gas through the orifice means to effect extinction of the arc therein.

22. A circuit interrupter including as an arc-extinguishing medium a gas comprising sulfur hexafluoride, conductor means between which an arc is formed on interruption of the circuit, arc confining and extinguishing means disposed along the path of the arc for extinguishing the arc in cooperation with the sulfur hexafluoride, and the arc confining and extinguishing means comprising a polymer of fluorinated ethylene selected from the group consisting of polytetrafluoroethylene and polychlorotrifluoroethylene, whereby corrosive acids will not be formed by the decomposition products of sulfur hexafluoride.

23. A circuit interrupter including means for establishing an arc within a gas comprising sulfur hexafluoride, insulating means disposed adjacent the established arc to assist the sulfur hexafluoride in effecting the extinction thereof, said insulating means comprising polychlorotrifluoroethylene.

24. A circuit interrupter including an enclosure containing sulfur hexafluoride gas, a chamber disposed within the enclosure having an orifice associated therewith, means for establishing an arc through the orifice, and means for producing a blast of sulfur hexafluoride gas passing through the orifice to extinguish the arc.

25. A circuit interrupter including means defining an orifice, means for establishing an arc adjacent the orifice, and means for forcing a gas comprising sulfur hexafluoride through the orifice and adjacent the arc to effect the extinction thereof.

26. A circuit interrupter including an enclosure containing sulfur hexafluoride gas, a chamber disposed within the enclosure having an orifice associated therewith, means for establishing an arc through the orifice, means for producing a blast of sulfur hexafluoride gas passing through the orifice to extinguish the arc, the orifice being formed at least in part of polytetrafluoroethylene, whereby corrosive acids will not be formed by the decomposition products of sulfur hexafluoride.

27. A circuit interrupter including an enclosure containing a substantial proportion of sulfur hexafluoride gas, a stationary contact disposed within the enclosure, a movable contact carrying a piston and cooperable with the stationary contact to establish an arc, the piston having an orifice associated therewith, an operating cylinder within which the piston is movable to force the gas through said orifice adjacent the arc, and the opening of the movable contact not only establishing an arc between the stationary and movable contacts, but also effecting working motion of the piston within the operating cylinder to effect a flow of the sulfur hexafluoride gas through the orifice adjacent the established arc whereby to extinguish the arc.

28. A circuit interrupter including an enclosure containing a substantial proportion of sulfur hexafluoride gas, a stationary contact disposed within the enclosure, a movable contact carrying a piston and cooperable with the stationary contact to establish an arc, the piston having an orifice associated therewith, an operating cylinder within which the piston is movable to force the gas through said orifice adjacent the arc, the opening of the movable contact not only establishing an arc between the stationary and movable contacts, but also effecting working motion of the piston within the operating cylinder to effect a flow of the sulfur hexafluoride gas through the orifice adjacent the established arc whereby to extinguish the arc, the orifice being formed at least in part fo polytetrafluoroethylene, whereby corrosive acids will not be formed by the decomposition products of sulfur hexafluoride.

29. A circuit interrupter including an enclosure containing a substantial proportion of sulfur hexafluoride gas, a stationary contact disposed within the enclosure, a movable contact carrying a piston having an orifice and cooperable with the stationary contact to establish an arc, the stationary contact extending at least part way through the orifice in he closed-circuit position, an operating cylinder within which the piston is movable, and the opening of the movable contact not only establishing an arc between the stationary and movable contacts, but also effecting working motion of the piston within the operating cylinder to effect a flow of the sulfur hexafluoride gas through the orifice adjacent the established arc whereby to extinguish the arc.

30. A circuit interrupter including an enclosure containing a substantial proportion of sulfur hexafluoride gas, a stationary contact disposed within the enclosure, a movable contact carrying a piston having an elongated orifice and cooperable with the stationary contact to establish an arc, the stationary contact extending at least part way through the elongated orifice in the closed-circuit position, an operating cylinder within which the piston is movable, and the opening of the movable contact not only establishing an arc between the stationary and movable contacts, but also effecting working motion of the piston within the operating cylinder to effect a flow of the sulfur hexafluoride gas through the elongated orifice adjacent the established arc whereby to extinguish the arc.

31. A circuit interrupter including as an arc-extinguishing medium a gas comprising sulfur hexafluoride and helium, means for establishing an arc within said medium, and the medium being capable of effecting extinction of the arc.

32. An arc-extinguishing gas comprising a mixture of sulfur hexafluoride and helium, over 50% of the gas preferably being sulfur hexafluoride.

33. A circuit interrupter including a pair of separable contacts, a member for moving at least one of said contacts to a position separated from the other, an arc extinguishing gas in the space between the contacts during their separating movement, said gas comprising sulfur hexafluoride, and said circuit interrupter being dependent upon the sulfur hexafluoride for the extinction of the arc drawn between said contacts.

References Cited in the file of this patent

UNITED STATES PATENTS

| | | |
|---|---|---|
| 1,898,900 | Ruppel | Feb. 21, 1933 |
| 1,912,024 | Uebermuth | May 30, 1933 |
| 1,928,470 | Whitney et al. | Sept. 26, 1933 |
| 2,108,560 | Kesselring | Feb. 15, 1938 |
| 2,221,671 | Cooper | Nov. 12, 1940 |
| 2,281,385 | Saint-Germain et al. | Apr. 28, 1942 |
| 2,531,007 | Strom et al. | Nov. 21, 1950 |
| 2,539,261 | Miller | Jan. 23, 1951 |
| 2,591,926 | Gibson et al. | Apr. 8, 1952 |
| 2,694,123 | Smith | Nov. 9, 1954 |